(12) United States Patent
Kumar et al.

(10) Patent No.: US 11,239,878 B2
(45) Date of Patent: Feb. 1, 2022

(54) METHOD AND SYSTEM FOR INTERFERENCE CANCELLATION IN MIMO WIRELESS SYSTEM

(71) Applicant: Indian Institute of Technology Madras (IIT Madras), Chennai (IN)

(72) Inventors: Abhishek Kumar, Chennai (IN); Sankaran Aniruddhan, Chennai (IN); Radha Krishna Ganti, Chennai (IN)

(73) Assignee: INDIAN INSTITUTE OF TECHNOLOGY, MADRA (IITM), Chennai (IN)

( * ) Notice: Subject to any disclaimer, the term of this patent is extended or adjusted under 35 U.S.C. 154(b) by 0 days.

(21) Appl. No.: 16/968,819

(22) PCT Filed: Feb. 13, 2019

(86) PCT No.: PCT/IN2019/050112
§ 371 (c)(1),
(2) Date: Aug. 10, 2020

(87) PCT Pub. No.: WO2019/159194
PCT Pub. Date: Aug. 22, 2019

(65) Prior Publication Data
US 2021/0006285 A1    Jan. 7, 2021

(30) Foreign Application Priority Data
Feb. 13, 2018 (IN) .............................. 201841005400

(51) Int. Cl.
*H04B 1/525* (2015.01)
*H04B 1/04* (2006.01)
*H04L 5/14* (2006.01)
*H04B 7/0413* (2017.01)

(52) U.S. Cl.
CPC ........... *H04B 1/525* (2013.01); *H04B 1/0483* (2013.01); *H04L 5/14* (2013.01); *H04B 7/0413* (2013.01)

(58) Field of Classification Search
CPC .... H04B 1/0483; H04B 1/525; H04B 7/0413; H04L 5/14
See application file for complete search history.

(56) References Cited

U.S. PATENT DOCUMENTS

| | | | | |
|---|---|---|---|---|
| 2014/0146717 A1* | 5/2014 | Mikhemar | ............ | H04B 1/525 370/278 |
| 2016/0218769 A1* | 7/2016 | Chang | .................... | H04B 1/525 |
| 2017/0026022 A1* | 1/2017 | Craninckx | ............. | H03H 7/463 |
| 2019/0207633 A1* | 7/2019 | Huusari | ................... | H03H 7/48 |

* cited by examiner

*Primary Examiner* — David B Lugo

(57) ABSTRACT

Embodiments herein provide a transceiver system 1000a-1000f for full-duplex communication. The transceiver system 1000a-1000f includes an electrical balance based duplexer (EBD) 100 coupled with at least one transceiver 200a and 200b and at least one antenna 300a and 300b. The at least one antenna 300a and 300b is configured to transmit first signals and the at least one antennas 300a and 300b is configured to receive second signals using at least one circulators. The EBD 100 is configured to provide an isolation between the transmitting signals and the receiving signals in a same channel full duplex (SCFD) front-end circuit using the at least one circulators.

13 Claims, 7 Drawing Sheets

METHOD AND SYSTEM FOR INTERFERENCE CANCELLATION IN MIMO WIRELESS SYSTEM

FIELD OF INVENTION

The present disclosure relates to a wireless communication system, and more specifically is related to a full duplex front-end circuit for a multiple-input-multiple-output (MIMO) wireless system. The present application is based on, and claims priority from an Indian Application Number 201841005400 filed on 13$^{th}$ Feb. 2018, and PCT/IN2019/050112 filed on 13$^{th}$ Feb. 2019, the disclosure of which is hereby incorporated by reference the disclosure of which is hereby incorporated by reference herein.

BACKGROUND

Self-interference from a transmitter is major challenge in same channel full duplex (SCFD) front end circuit. In multiple input multiple output (MIMO) SCFD system, signal leakage from another transmitting stream makes the interference even worse. The self-interference from the transmitter (Tx) can be suppressed using electrical balance based duplexer (EBD) like hybrid transformer. However, they suffer from insertion loss in Tx and receiver (Rx) paths. Balance network in the EBD can be replaced by another antenna to get rid of the insertion loss. But both of these antennas together transmit and receive single spatial stream.

Many conventional methods and circuit arrangements are proposed for isolating two or more TX paths from the two or more RX paths and to provide low-loss signal paths between output nodes of two or more transmit (TX) paths and the one or more antennas but, includes disadvantages in terms of power consumption, robustness, reliability, integrity issues, operation dependency, time, cost, complexity, design, hardware components used, size and so on.

Thus, it is desired to address the above mentioned disadvantages or other shortcomings or at least provide a useful alternative.

Object of Invention

The principal object of the embodiments herein is to provide a transceiver system for interference cancellation in full-duplex communication.

Another object of the embodiments herein is to provide a full duplex front-end circuit for a multiple-input-multiple-output (MIMO) wireless system.

Another object of the embodiments herein is to provide an electrical balance based duplexer (EBD) configured to obtain wideband isolation between two streams in 2×2 MIMO same channel full duplex (SCFD) front-end without incurring any insertion loss.

Another object of the embodiments herein is to provide a reciprocal nature of antenna coupling for cross-talk cancellation, so as to reduce the number of coupling networks required for MIMO full-duplex operation.

SUMMARY

Accordingly, the embodiments herein provide a transceiver system for full-duplex communication. The transceiver system includes an electrical balance based duplexer (EBD) coupled with at least one transceiver and at least one antennas. The at least one antennas is configured to transmit first signals and the at least one antennas is configured to receive second signals using at least one circulators. The EBD is configured to provide an isolation between the transmitting signals and the receiving signals in a same channel full duplex (SCFD) front-end circuit using the at least one circulators.

In an embodiment, the EBD is configured to provide the isolation between the transmitting signals and the receiving signals in the SCFD front-end circuit using the at least one circulators by passing transmitting signals and the receiving signals at a first port from the plurality of ports and at a second port from the plurality of ports through the at least one circulators, equally dividing the transmitting signals and transmitting the transmitting signals through the at least one antennas, receiving a portion of the transmitting signals transmitted from a first antenna from the at least one antennas by a second antenna from the at least one antennas, and matching input impedance to provide wide-band isolation between the two Tx/Rx pairs under balanced condition between the transmitting signals and the receiving signals in the SCFD front-end circuit using the at least one circulators.

In an embodiment, the EBD is configured to isolate the received signals from interference caused by the at least one transmitter.

In an embodiment, the EBD is fed with the transmitting signals through the at least one circulator at a pair of isolated ports.

In an embodiment, at least one signal interference (SI) cancellation circuit is placed in the at least one transceiver.

In an embodiment, a tuning network is placed between the at least one circulators and the EBD to manage the isolation of the first transmitting signals and the second receiving signals.

In an embodiment, a vector modulator is placed between the at least one circulators and the EBD to manage the isolation between isolation of the first transmitting signals and the second receiving signals by the at least one circulators.

Accordingly, the embodiments herein provide a method for interference cancellation in full-duplex communication. The method includes detecting, by an EBD, transmitting signals from at least one antennas. Further, the method includes detecting, by the EBD, receiving signals from the at least one antennas. Further, the method includes providing, by the EBD, an isolation between the transmitting signals and the receiving signals in a SCFD front-end circuit using at least one circulators.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This method is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
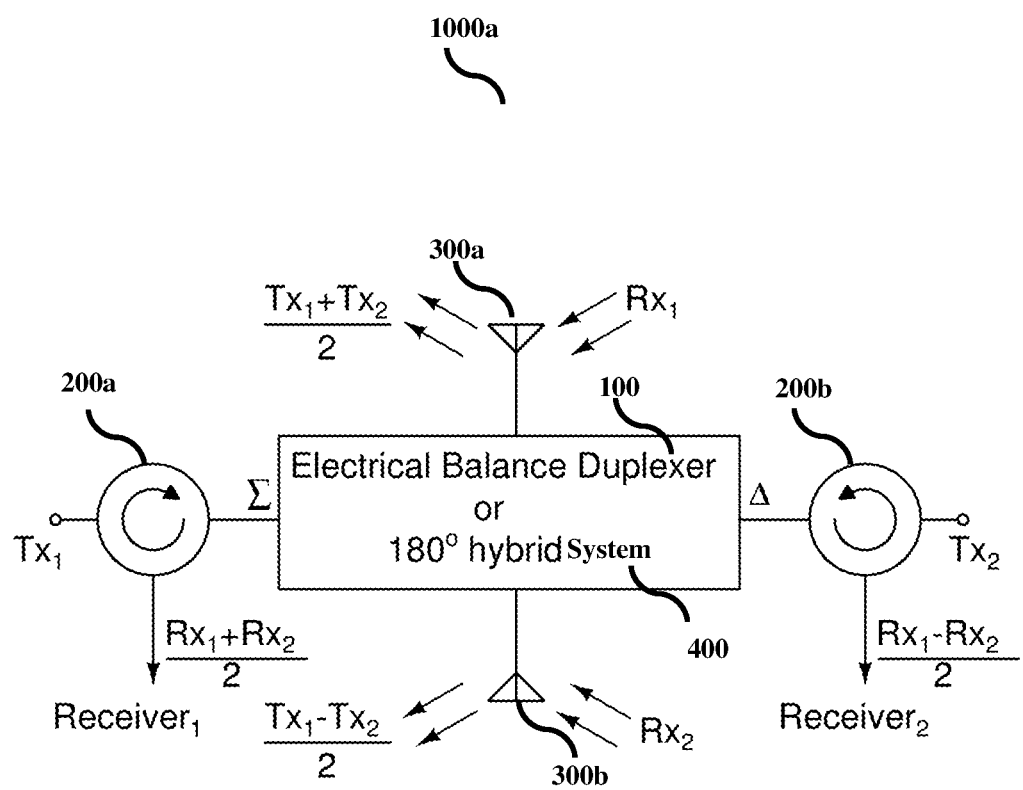
FIG. 1 is a schematic diagram illustrating 2×2 MIMO SCFD front-end for a MIMO wireless system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more of other embodiments to form new embodiments. The term "or" as used herein, refers to a "non-exclusive or", unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits, or the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the invention. Likewise, the blocks of the embodiments may be physically combined into more complex blocks without departing from the scope of the invention.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the embodiments herein achieve a transceiver system for full-duplex communication. The transceiver system includes an electrical balance based duplexer (EBD) coupled with at least one transceiver and at least one antennas. The at least one antennas is configured to transmit first signals and the at least one antennas is configured to receive second signals using at least one circulators. The EBD is configured to provide an isolation between the transmitting signals and the receiving signals in a same channel full duplex (SCFD) front-end circuit using the at least one circulators.

Unlike conventional methods and systems, the EBD is configured to obtain a wideband isolation between the two streams in 2×2 MIMO same channel full duplex (SCFD) front-end without incurring any insertion loss. Further, the proposed transceiver system can be used to transmit and receive two independent spatial streams using two antennas of the EBD.

The transceiver system can be used to provide Tx-Rx isolation to achieve SCFD operation in 2×2 MIMO using circulators. The transceiver system can be used to isolate received signal from interference caused by transmitter of other stream using the EBD.

In the proposed transceiver system, a reciprocal nature of antenna coupling provides a cross-talk cancellation, so as to reduce the number of coupling networks required for MIMO full-duplex operation.

The proposed system can be used to cancel cross-talk between two Tx-Rx pairs in the presence of antenna coupling in the MIMO wireless system. This is achieved by connecting two antennas and two Tx-Rx pairs through the EBD.

Referring now to the drawings, and more particularly to FIGS. 1 through 7, there are shown preferred embodiments.

FIG. 1 is a schematic diagram illustrating 2×2 MIMO SCFD front-end circuit for a MIMO wireless system, according to embodiments as disclosed herein.

As shown in the FIG. 1, the transceiver system 1000*a* includes an electrical balance based duplexer (EBD) 100 coupled with at least one transceiver 200*a* and 200*b* and at least one antennas 300*a* and 300*b*. The at least one antennas 300*a* and 300*b* is configured to transmit first signals and the at least one antennas 300*a* and 300*b* is configured to receive second signals using at least one circulators (not shown). The EBD 100 is configured to provide an isolation between the transmitting signals and the receiving signals in a same channel full duplex (SCFD) front-end circuit using the at least one circulators. The EBD 100 isolates received signal from interference caused by a transmitter (not shown) of other stream.

In an embodiment, in each transceiver 200*a* and 200*b*, Tx and Rx are shown isolated using the at least one circulator, which can be replaced with any other SI cancellation circuit. The Tx/Rx pairs are connected to sum and difference ports of the EBD 100. The EBD 100 can also be called as a coupler. Since the two antennas 300*a* and 300*b* will have closely matched input impedance, this configuration will result in wideband isolation between the two Tx/Rx pairs under balanced condition. In the presence of reflectors (not shown) in the antenna environment which are common to both the antennas, reflected signal will only appear at a respective Rx port.

In an example, the EBD 100 is fed with two transmitting signals Tx1 and Tx2, through two circulators at a pair of isolated ports (not shown). As a result, linear combination of the two Tx signals are transmitted by the two antennas 300*a* and 300*b*. Similarly linear combination of signal received by the two antennas 300*a* and 300*b* is collected at the two circulators. Further, the circulators provide Tx-Rx isolation to achieve SCFD operation. The EBD 100 isolates received signal from interference caused by the transmitter of other stream. In another embodiment, the EBD 200 in the proposal transceiver system 1000*a* can be replaced by any 4 port device which provide similar functionality for example a 180 degree hybrid system 400. Operations and function of the 180 degree hybrid system 400 is similar to the EBD 100.

Further, the transceiver system 1000*a* can be used to transmit the linear combination of the two Tx signals using the two antennas 300*a* and 300*b*. The transceiver system 1000*a* can be used to collect the linear combination of signals received by the two antennas 300*a* and 300*b* using two circulators.

Further, a reciprocal coupling network arranged between transceiver pairs and antennas based on the EBD 100 is for the MIMO system reduces the number of cross-connecting networks and variables required to mitigate cross-talk interference (CI) and maintain reliable CI cancellation in the presence of common-mode reflectors.

In each transceiver 200*a* and 200*b*, Tx and Rx are shown isolated using the circulator. Tx/Rx pairs through the circulator are connected to a sum port ($\Sigma$) and difference ($\Delta$) port of the EBD 100. The first port is a sum port and a second port is a difference ($\Delta$) port. The signal from Tx1 is divided equally and transmitted through the two antennas 300*a* and 300*b*. Due to the antennas interaction, the part of the signal transmitted from one antenna 200*a* is received by another antenna 200*b* and vice-versa. The reciprocal nature of the antenna coupling ensures that equal and same phase signal couples to the two antennas 300*a* and 300*b*. Therefore, the coupled signal is cancelled at the difference port and appear only at a receiver connected to the sum port which can be treated as self-interference. Similarly, it can be shown that signal from the Tx2 when couples back to the antennas 300*a* and 300*b*, only appears at the receiver connected to the difference port. Since the two antennas will 300*a* and 300*b* have closely matched input impedance, this configuration will result in wide-band isolation between the two Tx/Rx pairs under a balanced condition. Above discussion can be extended to show that in the presence of reflectors in the antenna environment which are common to both the antennas, reflected signal just like coupled signal will only appear as self-interference.

Figure 2:
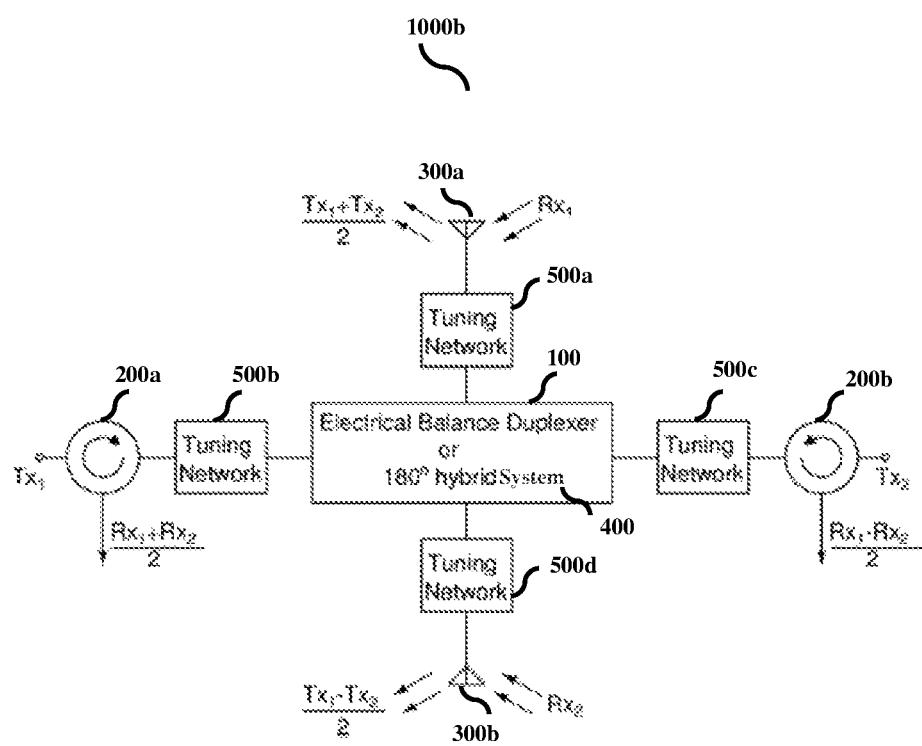
FIG. 2 is a schematic diagram illustrating 2×2 MIMO SCFD front-end with a tuning network for the MIMO wireless system, according to embodiments as disclosed herein.

FIG. 2 is a schematic diagram illustrating 2×2 MIMO SCFD front-end with at least one tuning network 500*a*-500*d* for the MIMO wireless system, according to embodiments as disclosed herein.

As shown in the FIG. 2, the transceiver system 1000*b* includes the EBD 100 coupled with at least one transceiver 200*a* and 200*b* and at least one antennas 300*a* and 300*b*. The operations and functions of the EBD 100, the at least one transceiver 200*a* and 200*b* and the at least one antennas 300*a* and 300*b* are explained in conjunction with the FIG. 1. Further, the tuning networks 500*a*-500*d* is placed between the at least one circulators and the EBD 200 to manage the isolation of the first transmitting signals and the second receiving signals to improve Tx-Rx isolation in the MIMO wireless system. The tuning networks 500*a*-500*d* includes tunable circuit elements for enabling the variable impedance transformation in the MIMO wireless system.

In another embodiment, the EBD 200 in the proposal transceiver system 1000*b* can be replaced by any 4 port device which provide similar functionality for example the 180 degree hybrid system 400.

Figure 3:
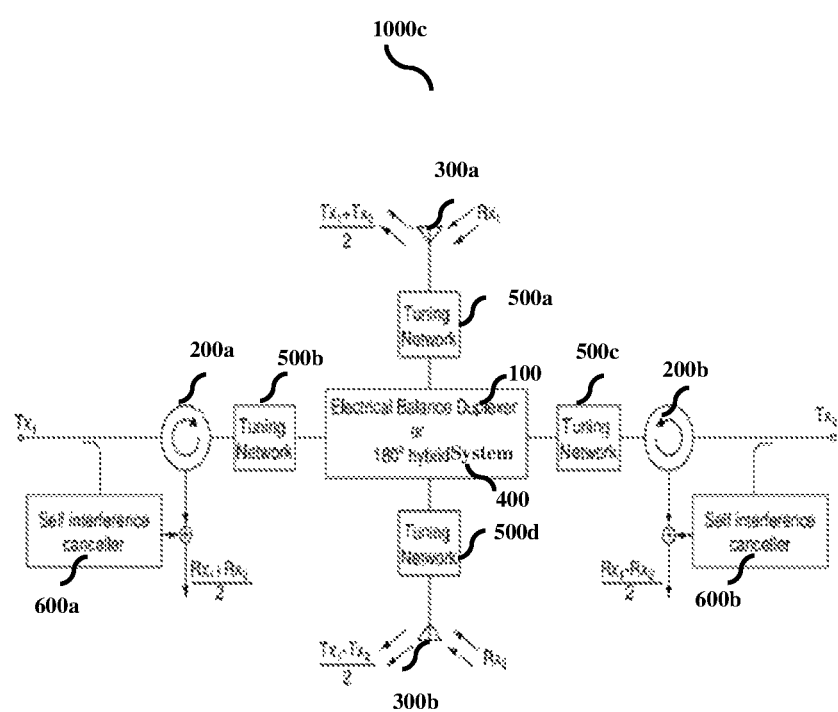
FIG. 3 is a schematic diagram illustrating 2×2 MIMO SCFD front-end with the tuning network and a vector modulator for MIMO wireless system, according to embodiments as disclosed herein.

FIG. 3 is a schematic diagram illustrating 2×2 MIMO SCFD front-end with tuning network and vector modulator for MIMO wireless system, according to embodiments as disclosed herein.

As shown in the FIG. 3, the transceiver system 1000*c* includes the EBD 100 coupled with at least one transceiver 200*a* and 200*b* and at least one antennas 300*a* and 300*b*. Further, the tuning networks 500*a*-500*d* is placed between the at least one circulators and the EBD 200 to manage the isolation of the first transmitting signals and the second receiving signals to improve Tx-Rx isolation in the MIMO wireless system. The operations and functions of the EBD 100, the at least one transceiver 200*a* and 200*b*, the at least one antennas 300*a* and 300*b*, and the tuning networks 500*a*-500*d* are explained in conjunction with the FIG. 1 and FIG. 2. Further, the at least one signal interference (SI) cancellation circuit 600*a* and 600*b* is placed in the at least one transceiver 200*a* and 200*b*. The vector modulator (or delay tapped filter) can be added in the transceiver system 1000*c* to increase isolation between Tx-Rx pair isolated by the circulator. The SI cancellation circuit 600*a* and 600*b* taps small part of Tx signal and transforms the Tx signal such that when added to main path, residual Tx signal in a main path is reduced. The SI cancellation circuit 600*a* and 600*b* can be realized using the vector modulator or delay tapped filter.

Figure 4:
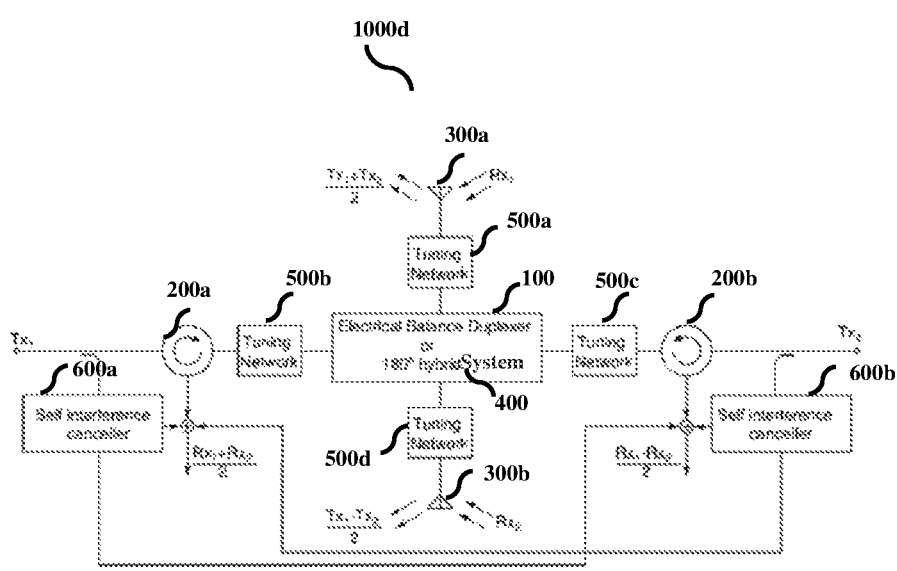
FIG. 4 is a schematic diagram illustrating 2×2 MIMO SCFD front-end with the tuning network and multiple output vector modulator for the MIMO wireless system, according to embodiments as disclosed herein.

FIG. 4 is a schematic diagram illustrating 2×2 MIMO SCFD front-end with the tuning network 500*a*-500*d* and multiple output vector modulator for the MIMO wireless system, according to embodiments as disclosed herein. The operations and functions of the EBD 100, the at least one transceiver 200*a* and 200*b*, the at least one antennas 300*a* and 300*b*, the tuning networks 500*a*-500*d*, and the vector modulator (or delay tapped filter) are explained in conjunction with the FIG. 1-FIG. 3. As shown in the FIG. 4, multiple output vector modulator (or delay tapped filter) added to increase isolation between Tx-Rx pair isolated by the circulator as well as the EBD 200.

Figure 5:
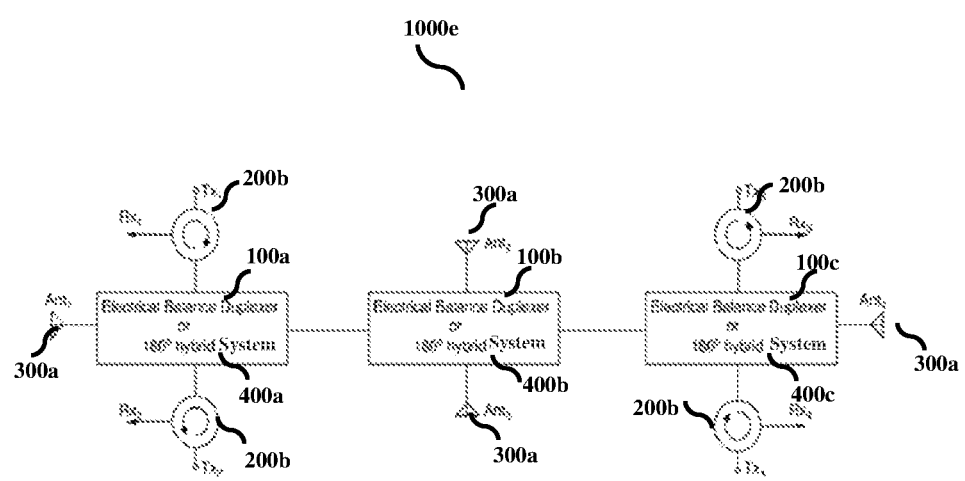
FIG. 5 and FIG. 6 are schematic diagram illustrating 4×4 MIMO SCFD front-end for the MIMO wireless system, according to embodiments as disclosed herein.
Figure 6:
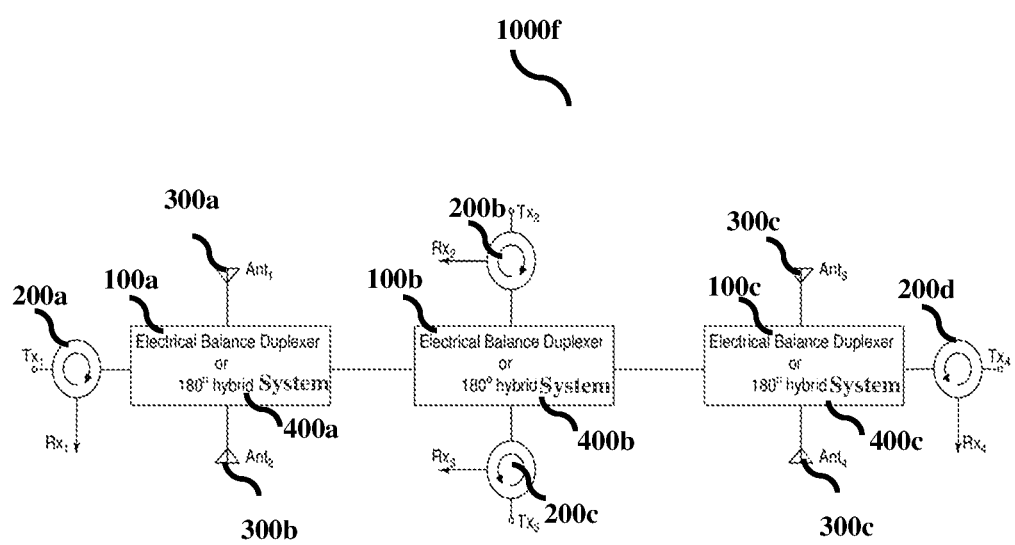

FIG. 5 and FIG. 6 are schematic diagrams illustrating 4×4 MIMO SCFD front-end for the MIMO wireless system, according to embodiments as disclosed herein. As shown in the FIG. 5 and FIG. 7, the proposed system can be extended to include more number of spatial streams. The operations and functions of the EBD 100, the at least one transceiver 200*a* and 200*b*, the at least one antennas 300*a* and 300*b*, the tuning networks 500*a*-500*d*, and the vector modulator (or delay tapped filter) are explained in conjunction with the FIG. 1-FIG. 4.

Figure 7:
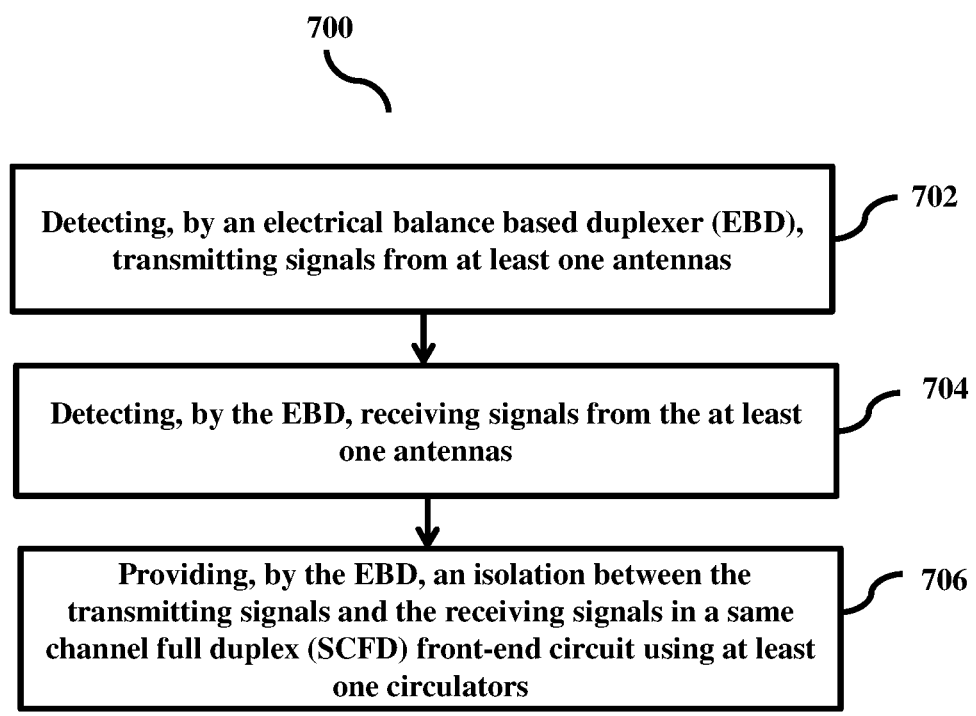
FIG. 7 is a flow diagram illustrating a method for managing an interference cancellation in the MIMO wireless system, according to embodiments as disclosed herein.

FIG. 7 is a flow diagram 700 illustrating a method for managing the interference cancellation in the MIMO wireless system, according to embodiments as disclosed herein. At 702, the method includes detecting, by the EBD 100, transmitting signals from the at least one antennas 300*a* and 300*b*. At 704, the method includes detecting, by the EBD 100, receiving signals from the at least one antennas 300*a* and 300*b*. At 706, the method includes providing, by the EBD 100, the isolation between the transmitting signals and the receiving signals in the SCFD front-end circuit using the at least one circulators.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A transceiver system for full-duplex communication, comprising:
    an electrical balance based duplexer (EBD) coupled with at least one transceiver and at least one antenna antennas, wherein the EBD 100 comprises a plurality of ports;
    the at least one antenna configured to transmit first signals;
    the at least one antenna configured to receive second signals using at least one circulator;
    wherein the is configured to provide an isolation between the transmitting signals and the receiving signals in a same channel full duplex (SCFD) front-end circuit using the at least one circulator by:
        passing transmitting signals and the receiving signals at a first port from the plurality of ports and at a second port from the plurality of ports through the at least one circulator;
        equally dividing the transmitting signals and transmitting the divided signals through the at least one antenna;
        receiving a portion of the divided transmitting signals transmitted from a first antenna from the at least one antenna and a second antenna from the at least one antenna; and
        matching input impedance to provide wide-band isolation between two Tx/Rx pairs under balanced condition between the transmitting signals and the receiving signals in the SCFD front-end circuit using the at least one circulator.

2. The transceiver system of claim 1, wherein the EBD is configured to isolate the first received signals from interference caused by the at least one transceiver.

3. The transceiver system of claim 1, wherein the EBD is fed with the transmitting signals through the at least one circulator at a pair of isolated ports.

4. The transceiver system of claim 1, wherein at least one signal interference (SI) cancellation circuit is placed in the at least one transceiver.

5. The transceiver system of claim 1, wherein at least one tuning network is placed between the at least one circulator and the EBD to manage the isolation of the first transmitting signals and the second receiving signals.

6. The transceiver system of claim 1, wherein a vector modulator is placed between the at least one circulators and the EBD to manage the isolation between isolation of the first transmitting signals and the second receiving signals by the at least one circulator.

7. A method for interference cancellation in full-duplex communication, comprising:
    detecting, by an electrical balance based duplexer (EBD) transmitting signals from at least one antenna;
    detecting, by the EBD, receiving signals from the at least one antenna; and
    providing, by the EBD, an isolation between the transmitting signals and the receiving signals in a same channel full duplex (SCFD) front-end circuit using at least one circulator by:
        passing transmitting signals and the receiving signals at a first port from the plurality of port and at a second port from the plurality of ports through the at least one circulator;
        equally dividing the transmitting signals and transmitting the divided transmitting signals through the at least one antenna;
        receiving a portion of the divided transmitting signals transmitted from a first antenna of the at least one antennas and a second antenna from the at least antenna; and
        matching input impedance to provide wide-band isolation between Tx/Rx pairs under balanced condition between the transmitting signals and the receiving signals in the SCFD front-end circuit using the at least one circulator.

8. The method of claim 7, wherein the EBD is coupled with at least one transceiver and at least one antenna, wherein the at least one antenna is configured to receive the signals using at least one circulator.

9. The method of claim 8, wherein the EBD is configured to isolate the received signals from interference caused by the at least one transceiver.

10. The method of claim 7, wherein the EBD is fed with the transmitting signals through the at least one circulator at a pair of isolated ports.

11. The method of claim 8, wherein at least one signal interference (SI) cancellation circuit is placed in the at least one transceiver.

12. The method of claim 7, wherein at least one tuning network is placed between the at least one circulator and the EBD to manage the isolation of the first transmitting signals and the second receiving signals.

13. The method of claim 7, wherein a vector modulator is placed between the at least one circulators and the EBD to manage the isolation between isolation of the first transmitting signals and the second receiving signals by the at least one circulator.

* * * * *